(12) United States Patent
Wheland et al.

(10) Patent No.: US 9,169,338 B2
(45) Date of Patent: Oct. 27, 2015

(54) PHOTOCROSSLINKABLE FLUOROPOLYMERS, UV PROCESSES AND PHOTOCROSSLINKED POLYMERS

(75) Inventors: Robert Clayton Wheland, Wilmington, DE (US); Roger Harquail French, Cleveland Heights, OH (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 153 days.

(21) Appl. No.: 13/809,926

(22) PCT Filed: Jul. 13, 2011

(86) PCT No.: PCT/US2011/043795
§ 371 (c)(1),
(2), (4) Date: Jan. 14, 2013

(87) PCT Pub. No.: WO2012/009398
PCT Pub. Date: Jan. 19, 2012

(65) Prior Publication Data
US 2013/0131213 A1    May 23, 2013

Related U.S. Application Data

(60) Provisional application No. 61/363,774, filed on Jul. 13, 2010.

(51) Int. Cl.
*C08F 214/18* (2006.01)
*C08F 214/26* (2006.01)
*C08F 14/18* (2006.01)

(52) U.S. Cl.
CPC ............. *C08F 14/185* (2013.01); *C08F 214/18* (2013.01); *C08F 214/186* (2013.01); *C08F 214/188* (2013.01); *C08F 214/26* (2013.01); *C08F 214/262* (2013.01)

(58) Field of Classification Search
CPC ........... C08L 27/12; C08L 7/14; C08L 27/16; C08L 27/18; C08L 27/20; C08L 27/22; C08L 27/24; C08L 2312/00; C08L 2312/06; C08F 214/00; C08F 214/18; C08F 214/184; C08F 214/185; C08F 214/20; C08F 214/202; C08F 214/22; C08F 214/222; C08F 214/225; C08F 214/26; C08F 214/262; C08F 214/285; C08F 214/28; C08F 214/282; C08F 2008/10; C08F 2810/20; C08K 5/14; C08K 2003/3045; C08J 2327/24; C08J 2327/00; C08J 2327/22; C08J 3/28
USPC .......................... 522/156, 155, 185, 184, 187
See application file for complete search history.

(56) References Cited

U.S. PATENT DOCUMENTS

| | | | |
|---|---|---|---|
| 4,694,045 A | * | 9/1987 | Moore .......................... 525/276 |
| 4,982,056 A | | 1/1991 | Squire |
| 4,983,697 A | * | 1/1991 | Logothetis .................... 526/206 |
| 5,168,001 A | | 12/1992 | Legare et al. |
| 5,266,639 A | | 11/1993 | Chapman, Jr. et al. |
| 5,408,020 A | | 4/1995 | Hung et al. |
| 7,129,009 B2 | | 10/2006 | French et al. |
| 2001/0036972 A1 | | 11/2001 | Ruepping |

FOREIGN PATENT DOCUMENTS

WO    2005043239 A1    5/2005

OTHER PUBLICATIONS

Du, Libin et al., Fluoropolymer synthesis in supercritical carbon dioxide, The Journal of Supercritical Fluids, 2009, pp. 447-457, vol. 47.
Wood, Colin D. et al., New fluoropolymer materials, Journal of Fluorine Chemistry, 2004, pp. 1671-1676, vol. 125.

* cited by examiner

*Primary Examiner* — Sanza McClendon

(57) ABSTRACT

This invention relates to certain photocrosslinkable fluoropolymers, processes for crosslinking the fluoropolymers using UV radiation, and the photocrosslinked fluoropolymers produced.

5 Claims, No Drawings

PHOTOCROSSLINKABLE FLUOROPOLYMERS, UV PROCESSES AND PHOTOCROSSLINKED POLYMERS

FIELD OF THE INVENTION

This invention relates to certain photocrosslinkable fluoropolymers, processes for crosslinking the fluoropolymers using UV radiation, and the photocrosslinked fluoropolymers produced.

BACKGROUND

Fluoropolymers often need to be cured in order to develop the physical properties necessary for particular end use applications.

It is known to incorporate cure-site monomers such as $CF_2$=$CFOCF_2CF(CF_3)OCF_2CF_2CN$ into fluoroelastomers and then cure the fluoroelastomer using a catalyst and long exposure to high temperatures. However, catalyst residues may adversely affect the properties of the cured fluoroelastomer, or byproducts of the curing reaction may pose environmental problems. Long exposure to high temperatures may increase manufacturing costs and can cause polymer degradation.

Methods are also known for curing certain fluoropolymers by way of crosslinking the fluoropolymers through the use of electron beam or actinic radiation.

However, there remains a need for a process to crosslink fluoropolymers that does not expose the fluoropolymers to high energy processes that can degrade the fluoropolymer. There is also a need for fluoropolymers that are radiation-durable for use in photovoltaic and concentrating photovoltaic modules.

SUMMARY

One aspect of this invention is a process comprising:
a) providing a reaction mixture comprising:
  i) monomer A of formula $CF_2$=$CF(OC_xF_{2x})_w(OC_yF_{2y})_zR$, wherein
  w=1-3;
  x=1-10;
  y=1-10;
  Z=0-4;
  R=CN or $CO_2R^1$, where $R^1$=$C_1$-$C_4$ alkyl; and
  ii) monomer B selected from the group consisting of ethylene, propene, butenes, vinyl ethers, cyclo-olefins, and substituted derivatives thereof, wherein the substituent is selected from the group consisting of halogens, ether groups, and cyano groups; and
  iii) a free radical initiator; and
b) copolymerizing monomer A and monomer B to form a photocrosslinkable copolymer;
c) isolating the photocrosslinkable copolymer; and
d) exposing the photocrosslinkable copolymer to UV radiation to form a photocrosslinked copolymer.

Another aspect of this invention is a photocrosslinked copolymer produced by this process.

Another aspect of this invention is a device comprising a photocrosslinked copolymer produced by this process.

Another aspect of this invention is a photocrosslinkable fluoropolymer comprising:
a) EVE; and
b) E, TFE, VF2 or PDD.

Another aspect of this invention is a photocrosslinkable fluoropolymer comprising EVE, TFE, and at least one of PDD, PPVE, PMVE, PEVE, HFP, CTFE, 3FE, VF, and VF2.

Another aspect of this invention is a photocrosslinkable fluoropolymer comprising 8-CNVE, PDD, and one of TFE and EVEOCN.

DETAILED DESCRIPTION

Abbreviations

As Used Herein:
"8-CNVE" refers to $CF_2$=$CFOCF_2CF(CF_3)OCF_2CF_2CN$;
"EVE" refers to $CF_2$=$CFOCF_2CF(CF_3)OCF_2CF_2COOCH_3$;
"8-SAVE" refers to $CF_2$=$CFOCF_2CF(CF_3)OCF_2CF_2SO_2N_3$;
"E" refers to $CH_2$=$CH_2$;
"EVEOCN" refers to $CF_2$=$CFOCF_2CF(CF_3)OCF_2CF_2CH_2OCN$;
"HFP" refers to $CF_7$=$CFCF_3$;
"PDD" refers to perfluorodimethyldioxole;
"PEVE" refers to $CF_2$=$CFOCF_2CF_3$;
"PMVE" refers to $CF_2$=$CFOCF_3$;
"PPVE" refers to $CF_2$=$CFOCF_2CF_2CF_3$;
"TFE" refers to $CF_2CF_2$;
"CTFE" refers to $ClCF$=$CF_2$;
"3FE" refers to $CF_2$=$CHF$;
"VF" refers to $CH_2$=$CHF$;
"VF2" refers to $CH_2$=$CF_2$; and
"UV radiation" refers to ultraviolet radiation with a wavelength of 200 to 390 nm, although it is understood that most UV sources are not monochromatic so that crosslinking can for example be achieved with a mercury lamp that is for example nominally 253.7 nm.

In the context of this disclosure, a copolymer is said to comprise xx mole % of a given monomer to indicate that xx mole % of the repeat units of the copolymer are derived from that monomer.

1. Crosslinking Process

One aspect of this invention is a process comprising:
a) providing a reaction mixture comprising:
  i) monomer A of $CF_2$=$CF(OC_xF_{2x})_w(OC_yF_{2y})_zR$, wherein
  w=1-3;
  x=1-10;
  y=1-10;
  z=0-4; and
  R=CN or $CO_2R^1$, where $R^1$=$C_1$-$C_4$ alkyl; and
  ii) monomer B selected from the group consisting of ethylene, propene, butenes, vinyl ethers, cyclo-olefins, and substituted derivatives thereof, wherein the substituent is selected from the group consisting of halogens, ether groups, and cyano groups; and
  iii) a free radical initiator; and
b) copolymerizing monomer A and monomer B to form a photocrosslinkable copolymer;
c) isolating the photocrosslinkable copolymer; and
d) exposing the photocrosslinkable copolymer to UV radiation to form a photocrosslinked copolymer.

1a. Monomers and Mixtures

Monomer A comprises one or more fluoro-olefins of formula $CF_2$=$OF(OC_xF_{2x})_w(OC_yF_{2y})_zR$, where w, x, y, and z are integers and w=1-3; x=1-10; y=1-10; z=0-4; and R=ON or $CO_2R^1$, where $R^1$=$C_1$-$C_4$ alkyl. When x is 2 or more, $(OC_xF_{2x})$ can be linear (e.g., $-OCF_2CF_2-$) or branched (e.g., $-OC(F)(CF_3)-$). Similarly, when y is 2 or more, $(OC_yF_{2y})$ can be linear or branched. In some embodiments, x and y are each independently selected from 1, 2, 3, 4, 5, 6, 7, 8, 9, and 10, and can be the same or different. $R^1$ can be a linear $C_1$-$C_4$ alkyl group, or a branched $C_3$-$C_4$ group.

In some embodiments of this process, monomer A comprises one or more of EVE, 8-CNVE, 8-SAVE, and $CF_2$=$CFO(CF_2)_5CN$. In some embodiments, monomer A comprises only one of EVE, 8-CNVE, 8-SAVE, and $CF_2$=$CFO(CF_2)_5CN$.

In the process described herein, the R group (CN or $CO_2R^1$) provides the crosslinking site. In EVE, the crosslinking site is provided by a —$COOCH_3$ group; in 8-CNVE and $CF_2$=$CFO(CF_2)_5CN$, it is provided by a —CN group. No catalyst component is required to effect the photocrosslinking when a monomer of formula $CF_2$=$CFO(C_xF_{2x})(OC_yF_{2y})_zR$ is incorporated into the photocrosslinkable copolymer.

Suitable monomers for monomer B include any monomer which is known to copolymerize with $CF_2$=$CFOR_f$, where $R_f$ is a fluorinated alkyl group. Suitable monomers for monomer B include ethylene, propene, butenes, vinyl ethers, cycloolefins, and substituted derivatives thereof. Suitable substitutents on the monomers include halogens, ether groups, and cyano groups. In some embodiments, monomer B is selected from the group consisting of E, TFE, VF, VF2, PDD, PPVE, PMVE, PEVE, HFP, CTFE, 3FE, EVEOCN, and mixtures thereof. For example, mixtures of TFE and PDD, or TFE and PPVE, or POD and EVEOCN can be used.

In some embodiments, the mole % of monomer A in the reaction mixture is between 1 and 99 mole %, or between 2 and 80 mole %, or between 3 and 50 mole %. This provides copolymers in which monomers A and B are typically incorporated at similar molar ratios. In some embodiments, the molar ratio monomer A:monomer B in the copolymer is less than the molar ratio of monomer A:monomer B in the reaction mixture. Adjustments to the molar ratios in the reaction mixture can be made to obtain the desired molar ratio in the copolymer. Copolymers containing as little as 1 mole % of monomer A can be photocrosslinked. Copolymers containing high amounts of monomer A (e.g., >30%) have more photoactive groups for crosslinking, but can be more difficult to make at high molecular weight. If molecular weights are higher than desired, chain transfer agents can be added to the polymerization. Suitable chain transfer agents include hydrogen-containing compounds such as molecular hydrogen, the lower alkanes, and the lower alkanes substituted with halogen atoms. Chain transfer agents include methane, ethane, and substituted hydrocarbons such as methyl chloride, methylene chloride, chloroform, and carbon tetrachloride. Chain transfer agents contribute end groups to a polymer, so for applications requiring extended environmental and/or sunlight durability, chain transfer agents that contribute —H and —$CH_3$ residues to chain ends, (e.g., $H_2$ and methane) are preferred. The amount of chain transfer agent used to achieve desired molecular weight will depend, for given polymerization conditions, on the amount of initiator used and the chain transfer efficiency of the chosen chain transfer agent. Chain transfer efficiency can vary substantially from compound to compound, and also varies with temperature.

The order of reactant addition follows convenience, the demands of the equipment, and demands of the polymer, as will be apparent to one skilled in the art. For example, in a batch polymerization, all reagents are charged at the outset, generally adding the less volatile monomers (e.g., EVE) before the more volatile monomers (e.g., E) as a matter of convenience. In a semibatch reactor, monomers and initiator are loaded as a precharge, and then additional monomer(s) and initiator are added as demanded by reaction rate and polymer composition. In a continuous reactor, monomers and initiator are fed simultaneously. Special situations such as core-shell polymer structures may require feeding one set of monomers at the outset and a different set of monomers later. Some monomers and initiators that have limited lifetimes at room temperature (e.g., PDD and DP) have chilling requirements that may affect when and how these reactants are fed.

1b. Solvents

Suitable solvents for the initiator and for monomer A include inert hydrocarbon, fluorocarbon, and chlorocarbon fluids such as $CF_3CFHCFHCF_2CF_3$, $CF_3CH_2CF_2CH_3$, $CF_3(CF_2)_6CF_3$, and $CFCl_2CCl_2F$. In the case of emulsion polymerization, the reaction medium is water to which a surfactant or dispersant has been added. Surfactants generally suitable for making fluoroolefin copolymers can be used. Such surfactants include ammonium perfluorooctanoate, ammonium perfluorononanoate, and the perfluoroalkyl ethane sulfonic acids and salts, as disclosed in U.S. Pat. No. 4,380,618. A solvent is not necessary either for polymerization or to carry an initiator into a reaction vessel. But use of a solvent can make it easier to get the polymer out of the reactor after polymerization as an emulsion, dispersion, or solution. In addition, an initiator such as HFPO dimer peroxide is explosive if handled as a pure compound, and it is typically diluted for safety reasons. Dilution to larger volume also makes it easier to add small amounts of initiator accurately, and it can provide a pumpable solution of a solid initiator.

1c. Initiators

The polymerizations of this invention can be run either non-aqueous or aqueous. Initiators employed in non-aqueous polymerization reactions include hydrofluorocarbon-, fluorocarbon-, or fluorochlorocarbon-soluble, free-radical initiators such as acyl peroxides, diacyl peroxides, peroxides, azo compounds, and perfluoroacyl peroxides, of which $CF_3CF_2CF_2OCF(CF_3)(C$=$O)OO(C$=$O)CF(CF_3)OCF_2CF_2CF_3$) is preferred. Initiators employed in aqueous emulsion polymerization are water-soluble free radical initiators such as ammonium persulfate, potassium persulfate, or disuccinic acid peroxide, or redox systems such as potassium permanganate or sulfite/persulfate systems.

1d. Polymerization Conditions (T, P)

Suitable temperatures for the copolymerization reaction are typically between 0-150° C., or 0-90° C., or 0-50° C. When monomer A comprises greater than about 10 mole % of the monomers in the reaction mixture, the copolymerization is typically carried out 0-90° C., or 0-50° C., to minimize chain transfer reactions that decrease the molecular weight of the copolymer produced. Emulsion polymerizations are typically limited to temperatures below 103-108° C., since surfactants tend to be less effective at higher temperatures.

The copolymerization is typically carried out in a pressure vessel such as an autoclave. Any workable pressure can be used to make the copolymers of this invention. Reaction rates tend to increase with increasing pressure. However, the polymerizations can be exothermic, so high reaction rate increases the heat that must be removed or accommodated as temperature increases. Pressures that can be used are also determined by equipment design and safety concerns in the handling of monomers such as TFE. Generally, pressures range from about 0-300 psi, depending upon how the polymerization is run. The pressure can be allowed to vary during the run as monomers are consumed or added, or held constant by the steady introduction of fresh monomers and/or initiator. The process can be run in batch, semi-batch, or continuous mode.

In some embodiments, the reaction product is a clear or hazy solution in which the copolymer is dissolved in the solvent used for the reaction mixture. In some embodiments, the copolymer is present as a solid at the end of the copolymerization reaction. In some embodiments, the reaction product is a gel. The photocrosslinkable copolymer can be soluble or insoluble in common solvents.

The photocrosslinkable copolymer can be elastic with a Tg below room temperature, or amorphous or glassy, with a Tg above room temperature. Alternatively, the photocrosslinkable copolymer can be crystalline, with a Tm above room temperature.

1e. Isolation of the Copolymer

Isolation of the copolymer can be carried out by any means known in the art for removing reaction products from a reaction vessel and isolating polymers from a polymerization mixture. In some embodiments, solvents and any residual, unreacted monomers are removed by evaporation in air under ambient conditions or under a flow of inert gas, or at reduced pressure and/or elevated temperatures. In some embodiments, the copolymerized reaction mixture is added to a non-solvent, e.g., an alcohol, to precipitate the copolymer as a solid. In some instances the solution can be used for coating purposes much as the solution comes out of the polymerization reaction. Solid copolymers can be further purified by washing with a non-solvent, e.g., a hydrocarbon or fluorocarbon. In the case of emulsion polymerization, traditional techniques known in the art (see U.S. Pat. No. 5,266,639) can be used to recover copolymer solids from aqueous polymerization media. For example, such methods as coagulation by vigorous agitation, optionally with added electrolyte, or by freezing and thawing, followed by separation of the wet solids from the liquid and then by drying can be used.

1f. Uses for the Photocrosslinkable Copolymer

Dispersions, solutions, and solid samples of the fluoropolymers of this invention can be used according to any of the techniques by which such systems are known to be used, including casting, dipping, painting, spraying, extruding, and spinning, making it possible to achieve end results that include any of the results for which polymer dispersions, solutions, and solids are used such as coating, encapsulation, impregnation, and the extruding and molding of solid objects. Examples of end uses include photovoltaic layers, photovoltaic glues, wire coatings, and wafer baskets. The photocrosslinkable copolymers are especially useful as encapsulants and as optical components in photovoltaic cells and concentrating photovoltaic cells, in which the copolymer is exposed to the equivalent of 1-50 suns or more, with an expected lifetime of at least 20 years.

The fluorine content of the photocrosslinkable copolymers is typically 1-75 wt %, depending on the composition and molar ratios of monomers A and B. Increasing the fluorine content in the copolymers is generally associated with greater chemical and thermal stability, which may be desirable properties.

1g. Crosslinking Reaction

The photocrosslinkable copolymer can be crosslinked by exposing it to UV radiation with a wavelength of 200-390 nm, with light much below 200 nm risking photochemical degradation of the polymer and light much above 250 nm tending towards low inefficiency and eventually total ineffectiveness. Broad spectrum lamps may still effective even if nominally above 250 nm. Exposure time can range from a period of a few microseconds to several days, weeks, months or even years. The exposure can be continuous or can occur at intervals.

The source of UV radiation can be natural (e.g., sunlight) or can be provided by commercially available UV light sources. A very high intensity UV radiation source (e.g., a PulseForge™ flash lamp) is capable of crosslinking a photocrosslinkable copolymer of this invention with a total exposure time of less than 0.1 second. Suitable low UV-intensity radiation sources include commercially available Rayonet Photochemical Reactor bulbs (catalog number R.P.R 2537A) for which, at a distance of one inch, the energy output of the bulb is about 0.2 milliwatts/cm$^2$. Higher UV-intensity radiation exposure can be provided by lithographic lamps, for example by a 1 kW deep-UV short arc lithographic lamp that provides a light intensity at the sample plane of ~11.5 milliwatts/cm$^2$ and has broad emission bands from about 260-270 nm and 210-255 nm. Exposure time is typically inversely related to UV intensity.

Longer exposure times and/or exposure to higher intensity UV radiation sources result in more highly crosslinked copolymers. Copolymers with higher monomer A content can also lead to more highly crosslinked copolymers.

The crosslinking reaction can be carried out in air, under an inert atmosphere (e.g., $N_2$), at a reduced pressure, or at an elevated pressure.

2. Crosslinked Copolymer

One aspect of this invention is a crosslinked copolymer formed by the process of this invention. This crosslinked copolymer can be used, for example, in an optical element of a photovoltaic or concentrating photovoltaic cell.

Changes in the physical and/or UV or IR spectroscopic characteristics of the photocrosslinkable copolymer are typically observed after exposure of the copolymer to UV radiation.

Spectroscopic changes are associated with the loss of the photolabile groups of monomer A and the formation of crosslinks. Since the loss of the photolabile groups results in a copolymer with increased transparency, the copolymer is said to be "bleached" relative to the copolymer prior to UV exposure. Bleaching can continue until all of the photolabile groups have reacted. Once the photolabile groups have all reacted, the crosslinked copolymer is more stable to UV radiation. Crosslinked copolymers with high fluorine content (e.g., more than 50% of the substituents on carbon are F) are especially stable to UV radiation because C—F bonds are inherently stronger that C—H bonds. Monomers such as EVE, TFE, PDD, and PPVE provide the high fluorine content responsible for the UV stability of the photocrosslinked polymers of some embodiments of this invention. Moreover, the copolymerization of highly fluorinated olefins such as EVE with hydrocarbon olefins such as E also helps ultimate UV transparency/stability because fluorocarbon monomers naturally alternate with hydrocarbon monomers in a way that favors UV transparency/stability (see U.S. Pat. No. 7,129,009 B2).

Physical changes that occur on exposure to UV radiation include those typically observed when other materials are crosslinked. Such changes include loss of "tackiness," increased MW, decreased solubility, decreased creep, higher use temperatures, increased cut-through resistance, increased abrasion resistance, and increased modulus.

3. Copolymers Comprising EVE and at Least One of E, TFE, VF2, or PDD.

Another aspect of this invention is a photocrosslinkable fluoropolymer C comprising:

a) 20-50 mole % EVE; and
b) 50-80 mole % of monomer D selected from the group consisting of E, TFE, VF2 and PDD.

In some embodiments, the portion of EVE is 30-50 mole %; in some embodiments, it is 40-50 mole %.

Photocrosslinkable fluoropolymer C can be prepared by a process comprising:
a) providing a reaction mixture comprising:
   i) 20-70 mole % of EVE;
   ii) 30-80 mole % of monomer D selected from the group consisting of E, TFE, VF2 and PDD; and
   iii) a free radical initiator;
b) copolymerizing EVE and monomer to form photocrosslinkable copolymer C; and
c) isolating photocrosslinkable copolymer C.

The optional use of solvents, selection of solvents, the initiators, reaction conditions (temperature and pressure), and isolation procedures are analogous to those described above.

4. Copolymers Comprising 8-CNVE, PDD, and One of TFE and EVEOCN.

Another aspect of this invention is a photocrosslinkable fluoropolymer G comprising:
   a) 1-50 mole % of 8-CNVE;
   b) 20-80 mole % PDD; and
   c) 1-79 mole % of TFE or EVEOCN.

In some embodiments, the portion of 8-CNVE is about 2-30 mole %. In some embodiments, the portion of PDD is about 40-70 mole %, or 50-60 mole %. In some embodiments, the portion of TFE is about 30-50 mole %. In some embodiments, the portion of EVEOCN is about 1-10 mole %.

Photocrosslinkable fluoropolymer G can be prepared by a process comprising:
a) providing a reaction mixture comprising
   i) 1-50 mole % of 8-CNVE;
   ii) 20-80 mole % of PDD;
   iii) 1-79 mole % of TFE or EVEOCN; and
   iv) a free radical initiator;
b) copolymerizing 8-CNVE, PDD and TFE or EVEOCN to form photocrosslinkable copolymer G; and
c) isolating photocrosslinkable copolymer G.

The optional use of solvents, selection of solvents, the initiators, reaction conditions (temperature and pressure), and isolation procedures are analogous to those described above.

5. Copolymers Comprising EVE, TFE and at Least One of POD, PPVE, PEVE, HFP, CTFE, 3FE, VF, and VF2.

Another aspect of this invention is photocrosslinkable fluoropolymer H comprising:
   a) 1-10 mole % of EVE;
   b) 30-98 mole % of TFE; and
   c) 1-69 mole % of a monomer selected from the group consisting of PDD, PPVE, PEVE, HFP, CTFE, 3FE, VF, and VF2.

Photocrosslinkable fluoropolymer H can be prepared by a process comprising:
a) providing a reaction mixture comprising:
   i) 1-10 mole % of EVE;
   ii) 30-98 mole % of TFE;
   iii) 1-69 mole % of PDD, PPVE, PEVE, HFP, CTFE, 3FE, VF, and VF2; and
   iv) a free radical initiator;
b) copolymerizing EVE, TFE, and at least one of PDD, PPVE, PEVE, HFP, CTFE, 3FE, VF, and VF2 to form photocrosslinkable copolymer H; and
c) isolating photocrosslinkable copolymer H.

In some embodiments, the monomers comprise EVE, TFE and one of PDD and PPVE.

The optional use of solvents, selection of solvents, the initiators, reaction conditions (temperature and pressure), and isolation procedures are analogous to those described above.

6. Devices Comprising a Photocrosslinked Copolymer Derived from a Copolymer Comprising 8-SAVE Another aspect of this invention is a device comprising a photocrosslinked copolymer, where the copolymer comprises 8-SAVE. Copolymers containing 8-SAVE are typically prepared by emulsion polymerization, where the reaction medium comprises water and a surfactant or dispersant. Surfactants generally suitable for making fluoroolefin copolymers can be used. Such surfactants include ammonium perfluorooctanoate, ammonium perfluorononanoate, and the perfluoroalkyl ethane sulfonic acids and salts, as disclosed in U.S. Pat. No. 4,380,618.

Suitable monomers for copolymerization with 8-SAVE include any monomer which is known to copolymerize with $CF_2$=$CFOR_f$, where $R_f$ is a fluorinated alkyl group. Suitable monomers for monomer B include ethylene, propene, butenes, vinyl ethers, cyclo-olefins, and substituted derivatives thereof. Suitable substitutents on the monomers include halogens, ether groups, and cyano groups.

Photocrosslinked copolymers containing 8-SAVE can be used, for example, as encapsulants or optical elements in devices such as photovoltaic cells or concentrating photovoltaic cells.

EXAMPLES

Abbreviations

DP: $CF_3CF_2CF_2OCF(CF_3)(C=O)OO(C=O)CF(CF_3)OCF_2CF_2CF_3$
Vertrel XF: $CF_3CFHCFHCF_2CF_3$
Fluorinert FC-40: a fluid sold by 3M, approximate structure perfluoro(tributyamine)
Novec HFE-7500: $(CF_3)_2CFCF(OC_2H_5)CF_2CF_2CF_2CF_3$ (available from 3M)
Light Sources:
Low UV-intensity radiation exposure was provided by a single Rayonet Photochemical Reactor bulb (catalog number R.P.R 2537A). At a distance of one inch, the energy output of the bulb is about 0.2 milliwatts/cm$^2$. Higher UV-intensity radiation exposure was provided by a 1 kW deep-UV short arc lithographic lamp, with a light intensity at the sample plane of ~11.5 milliwatts/cm$^2$. The lamp had broad emission bands from about 260-270 nm and 210-255 nm.

Example 1

Poly(EVE/E)

A. Preparation of Poly(EVE/E)

A 210 ml autoclave was chilled to about −20° C. and 42 ml of EVE and 10 ml of ~0.19 M DP initiator in Vertrel XF were added. The autoclave was evacuated and 3 g of ethylene were added. While shaking overnight, the pressure inside the autoclave reached a maximum of 84 psi at 20° C. after 45 min and decreased to 18 psi at 26.5° C. at the end of the run 921 min later. The resulting hazy fluid was transferred to a Teflon®-lined tray and allowed to evaporate first at ambient and then overnight in a 75° C. oven, at which point the clear, tacky residue weighed 22.4 g. The residue still weighed 22.4 g after another 24 hr in the 75° C. oven. The gum had a Tg of −36° C. (DSC, 10° C./min, N$_2$, second heat). Combustion analysis found 29.92% C and 1.64% H, versus 29.70% C and 1.65% H calculated for a polymer that is 47.6 mole % EVE and 52.4 mole % ethylene. A 0.1 g sample of residue readily dissolved in 1 ml of 2-heptanone, making a clear solution.

B. Photocrosslinking after 68 Hours at about 0.2 Milliwatts/cm² UV Intensity

A 0.52 g lump of poly(EVE/E) was placed on a glass microscope slide and the slide put in a 95° C. oven for 1 hr, causing the poly(EVE/E) to spread out to a circle ~¾" in diameter. The sample, in air, was placed about 1" under a single Rayonet Photochemical Reactor bulb. After 68 hr of UV exposure, the poly(EVE/E) was found to have transformed from a tacky glue-like material that was readily soluble in 2-heptanone to a non-tacky, modestly elastomeric polymer that swelled but did not dissolve in 2-heptanone.

C. Photocrosslinking after 15-60 Minutes at about 11.5 Milliwatts/cm² UV Intensity Three glass slides were spotted with ~0.2 g lumps of poly(EVE/E) and put in a 150° C. oven for 15 min, causing the poly(EVE/E) samples to spread out as films about 23 mils thick. These slides were then placed under a 1 kW deep-UV short arc lithographic lamp, with a light intensity at the sample plane of ~11.5 milliwatts/cm². When the first of the glass slides was withdrawn after 1 min of UV exposure, the polymer was found to be largely unchanged, quite tacky, and mostly soluble in 2-heptanone. When the second of the glass slides was withdrawn after 15 min of UV exposure, the polymer was found to be slightly tacky to the touch and to form a gel when mixed with 2-heptanone. When the third of the glass slides was withdrawn after 60 min of UV exposure, the polymer was found to be silky smooth to the touch, to spring back when indented with a fingernail, and to form a gel when mixed with 2-heptanone.

Example 2

Poly(EVE/TFE)

A. Preparation of Poly(EVE/TFE)

A 1 liter autoclave was loaded with 200 ml of EVE, heated to 30° C. with stirring, pressured with 100 psi N₂, and vented three times. The autoclave was then pressured to 30 psi with TFE and vented, four times. The autoclave was pressured to 50 psi with TFE. Using a chilled line, 0.2 ml of ~0.2 M DP in Vertrel XF was injected. After stirring for 1 hr at ambient temperature, additional 0.2 M DP was injected at a rate of ~0.01 ml/min until 15 g of TFE had been adsorbed, while holding TFE pressure constant at 50 psi. A total of 6.72 ml of DP was injected over 623 min. The product mixture was recovered as a hazy fluid, with the consistency of motor oil. Excess EVE was distilled off under vacuum, eventually bringing the heating mantle 157° C. while pulling a vacuum of ~520 mm. This gave 40.2 g of slightly tacky gum. The gum had a Tg of ~30° C. (DSC, 10° C./min, N₂, second heat). NMR analysis found the polymer to be 34.4 mole % EVE and 65.6 mole % tetrafluoroethylene. A 0.1 g sample of residue readily dissolved in 1 g of hexafluorobenzene, making a clear solution with a few undissolved particulates. Inherent viscosity in hexafluorobenzene was 0.07 dL/g.

B. Photocrosslinking after 68 Hours at about 0.2 Milliwatts/cm² UV Intensity

A solution of 0.1 g poly(EVE/TFE) dissolved in 1 g of hexafluorobenzene was filtered through a 0.45 micron glass fiber filter, and then spotted on a glass microscope slide. Air-drying gave a clear film that was hazy at the edges. The film sample was placed about 1" under the Rayonet Photochemical Reactor bulb. After 68 hr of UV exposure, the poly(EVE/TFE) had transformed from a soft gum to a brittle film. Rolling a 0.0335 g piece of film with 0.5 g of hexafluorobenzene for 3 hours caused the film to gain 11% in weight to 0.0372 g. A curled piece of film maintained its shape for 2 hr in a 225° C. oven, a major change from the soft, gummy starting polymer prior to UV exposure.

C. Photocrosslinking after 15-60 Minutes at about 11.5 Milliwatts/cm² UV Intensity Three glass slides were spotted with ~0.2 g lumps of poly(EVE/TFE) and put in a 150° C. oven for 15 min, causing the poly(EVE/TFE) samples to spread out as films about 49 mils thick. These slides were then placed under the 1 kW deep-UV short arc lithographic lamp. When the first of the glass slides was withdrawn after 1 min of UV exposure, the polymer was found to be largely unchanged, still tacky, and still soluble in hexafluorobenzene. When the second of the glass slides was withdrawn after 15 min, the polymer was found to be non-tacky to the touch, and to form a swollen soft gel when mixed with hexafluorobenzene. When the third of the glass slides was withdrawn after 60 min, the polymer was found to be smooth to the touch, to spring back when indented with a fingernail, and to form a gel when mixed with hexafluorobenzene.

Example 3

Poly(EVE/VF2)

A. Preparation of Poly(EVE/VF2)

A 240 ml autoclave was chilled to about −20° C., and 42.2 ml of EVE dissolved in 20 ml of Vertrel XF and 25 ml of ~0.05 M DP initiator in Vertrel XF were added. The autoclave was evacuated and 13 g of vinylidene fluoride was added. Shaking overnight, the pressure inside the autoclave reached a maximum of 103 psi at 24° C. after 70 min and decreased to 5 psi at 25.4° C. at the end of the run 1090 min later. This gave a viscous, clear, water-white solution. Drying a 0.9637 g sample of this solution, first under a flow of nitrogen, and then overnight in a 75° C. oven gave 0.6703 g of tacky gum. It is estimated that the EVE content was 20-40 mole %.

B. Photocrosslinking after 15-60 Minutes at about 11.5 Milliwatts/cm² UV Intensity Three glass slides were spotted with ~0.2 g lumps of poly(EVE/E) and put in a 150° C. oven for 15 min, causing the poly(EVE/VF2) samples to spread out as films about 31 mils thick. These slides were then placed under the 1 kW deep UV short arc lithographic lamp. When the first of the glass slides was withdrawn after 1 min of UV exposure, the polymer was found to be largely unchanged, tacky, and soluble in 2-heptanone. When the second of the glass slides was withdrawn after 15 min, the polymer was found to be very slightly tacky to the touch and to form a gel when mixed with 2-heptanone. When the third of the glass slides was withdrawn after 60 min, the polymer was found to have no tack, to spring back when indented with a fingernail, and to form a gel when mixed with 2-heptanone.

Example 4

Poly(EVE/TFE/PDD)

A. Preparation of Poly(EVE/TFE/PDD)

A 210 ml autoclave was chilled to about −20° C., and 4 g of EVE dissolved in 50 ml of Vertrel XF, 14.2 ml of PDD, and 10 ml of ~0.17 M DP initiator in Vertrel XF were added. The autoclave was evacuated and 10 g of tetrafluoroethylene was added. Shaking overnight, the pressure inside the autoclave reached a maximum of 57 psi at 33.6° C. after 66 min, and decreased to 17 psi at 33.3° C. at the end of the run 990 min later. This gave a highly viscous solution that barely flowed. Drying under a N₂ flow for 43 hr under pump vacuum, and for 24 hr in a 75-52° C. vacuum oven, gave 32.55 g of polymer that had an inherent viscosity of 0.370 dL/g in hexafluorobenzene. Composition by fluorine NMR was 1.2 mole % EVE, 53.7 mole % TFE, and 45.1 mole % PDD.

B. Photocrosslinking after ~60 Minutes at ~11.5 Milliwatts/cm² UV Intensity

A solution was made by dissolving 0.2 g of poly(EVE/TFE/PDD) in 1.8 g of Fluorinert FC-40. Spotting three glass slides with the solution and air-drying gave thin, clear, colorless films. These slides were then placed under the 1 kW deep UV short arc lithographic lamp. When the first of the glass slides was withdrawn after 1 min of UV exposure, the polymer was found to be largely unchanged, non-tacky, rubbery in feel, and soluble in Fluorinert FC-40. When the second of the glass slides was withdrawn after 15 min, the polymer was found to be non-tacky, a bit stiffer, and to be soluble in Fluorinert FC-40. When the third of the glass slides was withdrawn after 60 min, the polymer was found to have no tack, to be still stiffer, and to form a gel that retained the shape of the starting film when mixed with Fluorinert FC-40.

Example 5

Poly(EVE/PDD)

A. Preparation of Poly(EVE/PDD)

A small sample vial equipped with serum cap and magnetic stir bar was loaded with 1 ml of PDD and 2 ml of EVE. The vial was flushed with $N_2$, and 1 ml of ~0.17M DP in Vertrel XF was injected. Three days later, a second ml of ~0.17M DP was injected. On the sixth day, the reaction mixture was added to ~30 ml of methanol. The resulting precipitate was filtered, sucked dry in the filter, and further dried for 16 hr under pump vacuum to give 0.71 g of product. Combustion analysis found 24.88% C, versus 25.24% C calculated for 1:1 poly(EVE:PDD).

B. Photocrosslinking Overnight at about 0.2 Milliwatts/cm² UV Intensity

Rolling a 0.1 g sample of poly(EVE/PDD) for 3 hr with 2 ml of perfluorooctane gave a clear, colorless solution, which was spotted on a glass microscope slide and air-dried to a clear, colorless film. The microscope slide, while in a quartz box under $N_2$, was irradiated overnight with the Rayonet Photochemical Reactor bulb. The recovered film was found to be insoluble in perfluorooctane.

Example 6

Poly(EVE/TFE/PPVE)

A. Preparation of Poly(EVE/TFE/PPVE)

A 400 ml autoclave was chilled to about −20° C., and 10 g of EVE dissolved in 100 ml of Vertrel XF, and 10 ml of ~0.2 M DP initiator in Vertrel XF were added. The autoclave was evacuated, and 5 g of perfluoropropylvinyl ether and 50 g of tetrafluoroethylene were added. Shaking overnight, the pressure inside the autoclave reached a maximum of 84 psi at 6.5° C. after 22 min, and decreased to 0 psi at 20.9° C. at the end of the run 1043 min later. The damp white solid was transferred to a vacuum filter, rinsed in the filter with Vertrel XF, sucked dry in the filter, and further dried overnight in a 130° C. vacuum oven, giving 53.2 g of product. While no compositional analysis was done, the fact that TFE pressure dropped to 0 psig suggests that most of starting 50 g of TFE was incorporated into the polymer, with EVE and PPVE making up the difference (i.e., the 3.2 g needed to get to 53.2 g of product).

B. Photocrosslinking after about 65 Hours at about 0.2 Milliwatts/cm² UV Intensity A 1 g sample of poly(EVE/TFE/PPVE) was placed between two Kapton sheets and heated for ten min between the platens of a 320° C. press before applying a force of 20,000 pounds for 22 min. This gave a hazy film ~3" in diameter and 4 to 5 mils thick. The film was cut in half and one half placed in a quartz box under $N_2$ where it was irradiated with a Rayonet Photochemical Reactor bulb. Dynamic mechanical analysis of the exposed and unexposed halves of the polymer film at 245° C. found the exposed half of the film to be stiffer, with a higher modulus (34 MPa) than the unexposed half of the film (22 MPa).

Example 7

Poly(TFE/PMVE/PEVE/8-SAVE)

A. Preparation of Poly(TFE/PMVE/PEVE/8-SAVE)

A 1 liter autoclave was charged with 450 ml of distilled water, 0.8 g of ammonium persulfate, 3 g of $C_8F_{17}COONH_4$, and 20 g of $CF_2=CFOCF_2CF(CF_3)OCF_2CF_2SO_2N_3$ (8-SAVE). The autoclave was sealed, evacuated and further loaded with 36 g of $CF_2=CFOCF_2CF_3$ (PEVE), 83 g $CF_2=CFOCF_3$ (PMVE), and 45 g of $CF_2=CF_2$ (TFE). The autoclave was heated slowly to 70° C., and then stirred for 8 hr at 70° C., while maintaining pressure from about 230-250 psi by the periodic addition of TFE:PMVE:PEVE in a roughly 1 g to 0.4 g to 025 g ratio. This gave an opalescent blue emulsion, with a small mass of precipitated polymer on top. The precipitated polymer was removed by filtering through cheesecloth packed in the neck of a filter funnel, giving 742 g of filtrate.

About 670 g of this filtrate were frozen and thawed. The resulting damp mass was broken into two batches, with each batch being washed in a Waring blender twice with 1000 ml of water, twice with 600 ml of methanol, and twice with 750 ml of acetone. Sucking the washed product dry in a Buchner filter gave springy, elastic cakes, 166 g from the first batch and 112 grams from the second batch.

The polymer analysed for 66.6 mole % TFE, 22.8 mole % PMVE, 9.2 mole % PEVE, and 1.4 mole % 8-SAVE by $^{19}F$ NMR. The polymer had a Tg of 6.5° C. (DSC, 10° C./min, $N_2$, second heat).

B. Photocrosslinking in ~17 Hours at about 0.2 Milliwatts/cm² UV Intensity

Rolling a 0.1 g sample of poly(TFE/PMVE/PEVE/8-SAVE) with 3 ml of Novec HFE-7500 gave a hazy solution, which was spotted on a glass microscope slide and air-dried to a colorless film. The microscope slide, while in a quartz box under $N_2$, was irradiated for 17 hr with a Rayonet Photochemical Reactor bulb. The irradiated poly(TFE/PMVE/PEVE/8-SAVE) did not redissolve in Novec HFE-7500.

Example 8

Very Fast Crosslinking of Poly(EVE/E), Poly(EVE/VF2), and Poly(EVE/TFE)

A. Sample Preparation

Lumps of poly(EVE/E), poly(EVE/VF2), and poly(EVE/TFE) weighing from ~0.2 to 0.4 g were spread on glass microscope slides by heating for 1 hr in a 120° C. oven.

B. Photocrosslinking after 0.023 to 0.044 Second with High Intensity Flash Lamp

The thick films prepared above were exposed to very high intensity UV light using a PulseForge™ flash lamp (Nova- Centrix, Austin, Tex.). The exposures consisted of sixteen 80 microsecond exposures at increasingly high intensity, followed by 20 to 40 additional exposures at the highest intensity, each exposure lasting for 80 microseconds. After a total exposure time of 0.028 sec, the poly(EVE/E) broke into fragments (rather than dissolving) when rolled in 2-heptanone. After a total exposure time of 0.044 sec, the poly(VF2/EVE) swelled in 2-heptanone with a 92% weight gain when rolled with 2-heptanone. After a total exposure time of 0.028 sec, the poly(EVE/TFE) became a soft viscous gel rather than dissolving when rolled with hexafluorobenzene.

Example 9

Poly(8-CNVE/PDD/TFE)

A. Preparation of Poly(8-CNVE/PDD/TFE)

An autoclave was chilled to about −20° C., and 4 g of 8-CNVE dissolved in 20 ml of Vertrel XF, 14.2 ml of PDD, and 5 ml of ~0.17 M DP initiator in Vertrel XF were added. The autoclave was evacuated, and 7 g of tetrafluoroethylene were added. Shaking overnight, the pressure inside the autoclave reached a maximum of 110 psi at 17.3° C. after 59 min, and decreased to 49 psi at 34.1° C. at the end of the run, 1000 min later. This gave a colorless gel. Drying under a $N_2$ flow and then for 43 hr under pump vacuum gave 27.8 g of polymer that had an inherent viscosity of 0.476 dL/g in hexafluorobenzene. $^{19}$F NMR was consistent with a polymer composition of 2.3 mole % 8-CNVE, 42.3 mole % TFE, and 53.4 mole % PDD; 2 mole % of unreacted 8-CNVE monomer was also detected. Tg was 106° C. (second heat, 10° C./min, $N_2$). The polymer made viscous, clear solutions when dissolved at 0.1 g/1 g hexafluorobenzene and 0.1 g/2 g of Fluorinert FC-40.

B. Photocrosslinking after 71.5 Hours of Exposure to about ~0.2 Milliwatts/$cm^2$ UV Intensity Rolling a 0.1 g sample of poly(8-CNVE/PDD/TFE) with 1 g of Fluorinert FC-40 gave an extremely viscous solution which was spotted on a glass microscope slide and air-dried to a film. The microscope slide, while in a quartz box under $N_2$, was irradiated with a Rayonet Photochemical Reactor bulb. Recovering the poly(8-CNVE/PDD/TFE) after 71.5 hr, a 0.0130 g sample of film gave swollen gel with 0.5 g of Fluorinert FC-40.

Example 10

Poly(8-CNVE/EVEOCN/PDD)

A. Preparation of Poly(8-CNVE/EVEOCN/PDD)

A small sample vial equipped with serum cap and magnetic stir bar was loaded with 2 ml 8-CNVE, 0.2 ml EVEOCN, and 1 ml of PDD while chilling on dry ice. The vial was flushed with $N_2$, and 0.5 ml of ~0.2 M DP in Vertrel XF was injected. The vial was allowed to warm to room temperature with magnetic stirring. The next morning, a second 0.05 ml of ~0.17M DP was injected. On the following day, the viscous reaction mixture was blown down with $N_2$, giving 4.1 g of white solid that had an inherent viscosity of 0.108 dL/g in Novec HFE-7500. $^{19}$F NMR was consistent with a polymer composition of 22.2 mole % 8-CNVE, 4.4 mole % EVEOCN, and 63.4 mole % PDD; 7.6 mole % of unreacted 8-CNVE monomer and 2.4 mole % of unreacted EVEOCN monomer were also detected. Tg was 115° C. (second heat, 10° C./min, $N_2$). The polymer made clear solutions when dissolved at 0.1 g/1 g of either hexafluorobenzene or Novec HFE-7500.

B. Photocrosslinking after 70.5 Hours of Exposure of about 0.2 Milliwatts/$cm^2$ UV Intensity Rolling a 0.1 g sample of poly(8-CNVE/EVEOCN/PDD) with 1 g of Novec HFE-7500 gave a clear solution, which was spotted on a glass microscope slide and air-dried to a film. The microscope slide, while in a quartz box under $N_2$, was irradiated using a Rayonet Photochemical Reactor bulb. After 70.5 hr, a 0.021 g sample of film fragments showed no sign of solution or swelling with 1 g of Novec HFE-7500.

Radiation Durability Methods and Results

Solar Radiation Exposure Method

The following is a description of the solar simulated irradiation durability set up and procedures used to expose materials to simulated solar light, enabling the evaluation of the effect of full spectrum simulated solar radiation on the optical properties of materials.

A Solar Simulator (Model #92190-100, Newport Corporation, Irvine, Calif.), with a Newport Power Supply, (Model #69922) was used to expose samples to simulated solar radiation. A programmed power output was sent to a Newport Digital Exposure Control unit, (Model #68945), that was coupled with a fiber optic micro amp feed back sensor, located at the beam exit, to digitally control the light flux and deliver a constant power output to the samples over the duration of the test.

The Newport Solar Simulator uses a 1600 watt xenon lamp in combination with integrated internal optics, including AM 0 and AM1.5 correction filters, to deliver a diverging beam of simulated solar spectral radiation to the sample area. To measure the power output at the sample level, a Newport Power Meter (Model #1918-C) connected to a Newport thermopile detector (Model #818-250-25), located in the beam path, was used.

Radiation durability testing was done at uniform irradiance of 3.8 KW/$m^2$ at a working distance of 8.3 cm from the exit window of the simulator in an exposure area of 15 cm×15 cm. This working area allowed for the simultaneous testing of several samples. Typical sample size was 2.5 cm×4 cm; sample thickness varied from 0.025 to 2.5 mm. The total exposure dose in GJ/$m^2$ was calculated from the irradiance in kW/$m^2$ times the exposure time. The beam irradiance was measured using a Newport 25 watt thermopile type detector (Model #818-25-12).

Radiation durability was also tested at a uniform irradiance of 48 kW/$m^2$ by adding a Newport 13× concentrator lens assembly, (Model #SP81030-DIV) to the exit window of the Newport Solar Simulator. The assembly mounts onto the diverging solar simulator producing a 2.5 cm×2.5 cm working area at a distance of 8.5 cm from the final condensing lens, enabling testing samples up to 2.5 cm×0.5 cm in size. This beam irradiance was measured using a Newport 250 watt fan-cooled thermopile type detector (Model #818-250-25), with a 0.6 cm×0.6 cm aperture plate attached.

Temperature and relative humidity were not controlled during the durability tests, but were typical of an air-conditioned laboratory. Sample temperature increased from room temperature to typically 50° C. as samples were exposed to the simulated solar radiation.

Center Mount Absorbance Method

The optical absorbance of free-standing films and film on glass was determined by the center mount absorbance method over the entire 200-2500 nm wavelength range using a Varian Cary 5000 UV-Vis-NIR spectrophotometer with an accessory integrating sphere Varian DRA-2500. A clip-style variable angle center mount sample holder was used for the absorbance measurement for translucent films and film on glass samples. The measured value of absorbance was divided by the film thickness to obtain a value of optical absorbance per cm (base 10).

$$A/cm = (-\log T_{film})/t$$

$$A/cm = \frac{\log_{10}[T_{substrate}/T_{film}]}{t_{film}}$$

A is the base 10 optical absorbance per cm; T is the transmission of film, and t is the thickness of the film (cm). The calculation of optical absorbance assumes that the free-standing film is of homogenous composition and uniform thickness. For film on glass samples, the calculation of optical absorbance assumes that the transmission (T) of the glass substrate is 1. Transmission-based measurements also require that the film thickness of the sample on the substrate be optimized for the dynamic range of the technique so that the transmittance of the film falls in the range from 3 to 90%. If the transmittance falls much below 1%, the accuracy of the measurement is severely degraded, and erroneous results appear.

The center mount measurement was conducted under the following conditions: The external DRA-2500 was installed into the spectrophotometer and aligned. UV-Vis-NIR spectra were, in general, acquired in the region of 200-2500 nm using appropriate baseline correction (zero/baseline for % T and absorbance correction for spectral only). Indicative instrumental parameters were as follows: spectral bandwidth (SBW): 4 nm (UV/Vis), 16 nm (NIR); averaging time, 0.4 sec; data interval: 2 nm; double beam mode using full slit height for % T and absorbance, a small spot kit (SSK) was used for the center mount absorbance data.

As in all experimental measurements, the accuracy of the measured values is a function of the sample and measurement apparatus. The inherent sensitivity of spectral transmission and absorbance measurements is affected by the optical path length of the sample, and the transmission drop that occurs as light transmits through the sample. As the transmission drop decreases, the accuracy of absorbance measurement decreases. A transmission difference of ~0.1% is near the limit of the measurement method.

Average ΔAbs/cm per GJ/m² Dose Calculation

The change in the spectral optical absorbance (ΔAbs/cm (λ)) for an average of full spectrum solar radiation dose (in GJ/m²) is a useful metric, since this allows one to observe and study the sources of photochemical changes that occur over the exposure time. This is termed the average ΔAbs/cm per GJ/m² dose (or the "average absorbance to a total dose"), and this metric allows one to track the rates of photochemical processes (e.g., photobleaching and photodarkening) of both intrinsic and extrinsic components of the material and is scaled in units of 1 GJ/m² dose.

The average ΔAbs/cm per GJ/m² Dose is calculated by $$\text{Average } \frac{Abs}{cm} \text{ per } \frac{GJ}{m^2} \text{ Dose} = \frac{Abs_f(\lambda)/cm - Abs_i(\lambda)/cm}{Dose_{total}}$$

$Abs_f$ is the finial spectral optical absorbance, $Abs_i$ is the initial spectral optical absorbance and $Dose_{total}$ is the total dose the sample received

TABLE

Induced Absorbance Rates At 4 and 50 KW/m²

| | 4 Sun Irradiance | | | | 50 Sun Irradiance | | | |
|---|---|---|---|---|---|---|---|---|
| SAMPLE | kW/m² | GJ/m² | ΔAbs/Dose | At λ (nm) | kW/m² | GJ/m² | ΔAbs/Dose | At λ (nm) |
| Poly (TFE/EVE) | 3.79 | 37.4 | 0 | | 51.97 | 158 | 0.175 | 234 |
| Poly (TFE/PMVE/PEVE/8-SAVE) | 3.79 | 37.4 | 0.076 | 304 | 51.97 | 158 | 0.021 | 308 |

What is claimed is:

1. A photocrosslinked copolymer produced by a process comprising:
   a) providing a reaction mixture comprising:
      i) monomer A selected from the group consisting of EVE, 8-CNVE and $CF_2=CFO(CF_2)_5CN$,
      ii) monomer B selected from the group consisting of ethylene, TFE, VF, VF2, PDD, PPVE, PMVE, PEVE, HFP, CTFE, 3FE, and EVEOCN; and
      iii) a free radical initiator; and
   b) copolymerizing monomer A and monomer B to form a photocrosslinkable copolymer;
   c) isolating the photocrosslinkable copolymer to form an isolated photocrosslinkable copolymer; and
   d) exposing the isolated photocrosslinkable copolymer to UV radiation to affect photocrosslinking in the absence of catalyst and form a photocrosslinked copolymer;
   wherein
   the photocrosslinkable copolymer is a photocrosslinkable fluoropolymer consisting of:
      A) 20-50 mole % EVE; and
      B) 50-80 mole % of a monomer selected from the group consisting of ethylene, TFE and VF2.

2. A photocrosslinked copolymer produced by a process comprising:
   a) providing a reaction mixture comprising:
      i) monomer A selected from the group consisting of EVE, 8-CNVE and $CF_2=CFO(CF_2)_5CN$,
      ii) monomer B selected from the group consisting of ethylene, TFE, VF, VF2, PPVE, PMVE, PEVE, HFP, CTFE, 3FE, and EVEOCN; and
      iii) a free radical initiator; and
   b) copolymerizing monomer A and monomer B to form a photocrosslinkable copolymer;
   c) isolating the photocrosslinkable copolymer to form an isolated photocrosslinkable copolymer; and d) exposing the isolated photocrosslinkable copolymer to UV radiation to affect photocrosslinking in the absence of catalyst and form a photocrosslinked copolymer;
wherein
the photocrosslinkable copolymer is a photocrosslinkable fluoropolymer consisting of:
A) 1-10 mole % of EVE;
B) 30-98 mole % of TFE; and
C) 1-69 mole % of a monomer selected from the group consisting of PPVE, PMVE, PEVE, HFP, 3FE, VF, CTFE, and VF2.

3. A photocrosslinked copolymer produced by a process comprising:
a) providing a reaction mixture comprising:
i) monomer A selected from the group consisting of EVE, 8-CNVE and $CF_2$=$CFO(CF_2)_5CN$,
ii) monomer B selected from the group consisting of ethylene, TFE, VF, VF2, PDD, PPVE, PMVE, PEVE, HFP, CTFE, 3FE, and EVEOCN; and
iii) a free radical initiator; and
b) copolymerizing monomer A and monomer B to form a photocrosslinkable copolymer;
c) isolating the photocrosslinkable copolymer to form an isolated photocrosslinkable copolymer; and
d) exposing the isolated photocrosslinkable copolymer to UV radiation to affect photocrosslinking in the absence of catalyst and form a photocrosslinked copolymer;
wherein
the photocrosslinkable copolymer is a photocrosslinkable fluoropolymer consisting of:
A) 1-50 mole % of 8-CNVE;
B) 20-80 mole % PDD; and
C) 1-79 mole % of TFE or EVEOCN.

4. A device comprising a photocrosslinked copolymer of claim 1, 2 or 3.

5. A device comprising a photocrosslinked copolymer produced by a process comprising:
a) providing a reaction mixture comprising:
i) monomer A is selected from the group consisting of EVE, 8-CNVE, 8-SAVE, and CF2=CFO(CF2)5CN; and
ii) monomer B selected from the group consisting of ethylene, TFE, VF, VF2, PDD, PPVE, PMVE, PEVE, HFP, 3FE, CTFE, and EVEOCN; and
iii) a free radical initiator; and
b) copolymerizing monomer A and monomer B to form a photocrosslinkable copolymer;
c) isolating the photocrosslinkable copolymer to form an isolated photocrosslinkable copolymer; and
d) exposing the isolated photocrosslinkable copolymer to UV radiation to affect photocrosslinking in the absence of catalyst and form a photocrosslinked copolymer;
wherein
the photocrosslinked copolymer is selected from the group consisting of poly(TFE/PMVE/PEVE/8-SAVE).

* * * * *